United States Patent [19]
Hurter

[11] 3,992,248
[45] Nov. 16, 1976

[54] CONTINUOUS FEEDING SYSTEM FOR TREATMENT TOWERS
[75] Inventor: Alfred Max Hurter, Beaconsfield, Canada
[73] Assignee: Stadler Hurter Limited, Montreal, Canada
[22] Filed: Dec. 27, 1971
[21] Appl. No.: 212,505

Related U.S. Application Data
[63] Continuation-in-part of Ser. No. 37,700, May 15, 1970, abandoned.

[30] Foreign Application Priority Data
May 19, 1969 United Kingdom............... 25326/69

[52] U.S. Cl. ............................... 162/17; 68/181 R; 162/52; 162/237; 162/238; 162/246
[51] Int. Cl.² ........................ D21C 3/24; D21C 7/06
[58] Field of Search ............... 162/17, 52, 237, 243, 162/246, 238, 251; 68/181, 181 R

[56] References Cited
UNITED STATES PATENTS
3,243,341  3/1966  Lang ................................... 162/237
3,326,235  6/1967  Jones .............................. 162/246 X
3,397,718  8/1968  Jones .............................. 162/246 X
3,700,548  10/1972 Rich ....................................... 162/17

FOREIGN PATENTS OR APPLICATIONS
708,382  4/1965  Canada .............................. 162/246

Primary Examiner—S. Leon Bashore
Assistant Examiner—Richard V. Fisher
Attorney, Agent, or Firm—Alan Swabey

[57] ABSTRACT

An improvement in continuously feeding slurry material to vertical upflow treatment towers. The improvement comprises providing a plurality of spaced apart inlet or outlet openings in the bottom inlet end of the tower and opening and closing the openings in timed sequence to allow the material to selectively flow into the tower from different spaced locations but continuously at a substantially constant rate.

4 Claims, 3 Drawing Figures

CONTINUOUS FEEDING SYSTEM FOR TREATMENT TOWERS

CROSS-REFERENCE TO RELATED APPLICATION

This application is a continuation-in-part of United States application, Ser. No. 37,700, filed May 15, 1970, now abandoned.

BACKGROUND OF THE INVENTION

1. Field of the Invention

This invention relates to an improved method and apparatus for continuously feeding material through a substantially vertical flow treatment tower.

The invention is particularly directed toward an improved method and apparatus for continuously feeding a slurry or liquid of high viscosity into a substantially vertical upflow treatment tower so as to retain all the material passing through the tower, substantially for the same length of time in the tower.

2. Description of the Prior Art

In a continuous feed, vertical upflow tower, one or more portions of the material may flow from the lower end of the tower to the upper end in one or more streams of material, the streams moving at a faster speed through the tower than the speed at which the remaining portions of the material in the tower move through the tower. Such a condition is commonly known as "channeling". Channeling can readily occur when the tower has a central single, lower inlet and a central single, upper outlet. The material, entering the tower through a central, single, lower inlet, which inlet usually has a small diameter relative to the diameter of the tower, tends to form a central stream which meanders up through the tower at a faster rate of speed than the remaining portion of the material within the tower, which portion is generally located at the sides of the tower.

In towers used to treat material, such as, for example, by chemical, biochemical, or thermal treatment, the channeling effect results in shorter retention times for the material travelling in the streams as compared to the retention times for the material not travelling in the streams, thereby resulting in the material being unevenly treated during its passage up through the tower.

In an attempt to minimize the channeling effect, vertical upflow retention towers, such as, for example, those used in the continuous bleaching of pulp, the tower can be made tall and slim to provide a larger than normal height-to-diameter ratio. In slim towers, there is less likelihood of channeling occurring. Such towers can be satisfactorily used to minimize channeling in small capacity bleaching plants or where a minimum amount of retention time is required to treat pulp. However, towers with a high height-to-diameter ratio become very expensive when longer retention times or larger bleaching plant capacities are required. Thus, towers of a lower height-to-diameter ratio are generally used for the sake of economy, but such towers are more prone to channeling.

In upflow towers, attempts have been made to minimize the channeling effect by providing a number of agitators set at various elevations from the bottom to the top of the tower, but they have not been completely effective.

The higher the consistency or viscosity of the material flowing through the tower, the greater the possibility of channeling occuring. When using high consistency or high viscosity material in upflow towers, the towers have been provided with hemispherical or conical bottoms together with rotary mixers or flow distributors at the inlet or base of the tower. However, none of these solutions have been found to be very effective unless the tower has a high height-to-diameter ratio which, as previously mentioned, increases the cost, particularly when such towers are used in systems having a very large capacity.

A further solution to the channeling problem has been proposed by providing a number of inlets into the tower to obtain a more uniform inlet flow distribution within the tower. However, the flow from each of the several inlets is continuous and thus multiple channeling can still occur with a stream originating from each inlet.

SUMMARY OF THE INVENTION

It is the purpose of the present invention to provide for continuous feed of material through a vertical upflow treatment tower while more effectively minimizing channeling of the material, particularly when slurries are treated, while at the same time avoiding the expense of constructing thin elongated towers having a high height-to-diameter ratio.

The invention relates to a method for improving the continuous feeding of material through a substantially vertical upflow treatment tower having vertically spaced apart, lower inlet and upper outlet ends with the lower end having a plurality of spaced apart material flow passages. The method includes the steps of continuously presenting material under pressure to all of said flow passages and opening and closing the flow passages in timed sequence to allow the material to flow selectively through the passages.

The invention also relates to a tower for treating material continuously flowing vertically therethrough, said tower having vertically spaced apart, lower material inlet and upper material outlet ends. A feeding unit at the lower end continuously passes therethrough material to be treated in the tower. The feeding unit comprises a plurality of spaced apart material passages and operable means are associated with each passage for controlling flow of material through each said passage. Control means control the operable means in timed sequence to pass material selectively through the passages, but continuously into the tower at a constant rate.

BRIEF DESCRIPTION OF THE DRAWINGS

The invention will now be described in detail having reference to the accompanying drawings, wherein.

DESCRITPION OF THE PREFERRED EMBODIMENT

Figure 1:
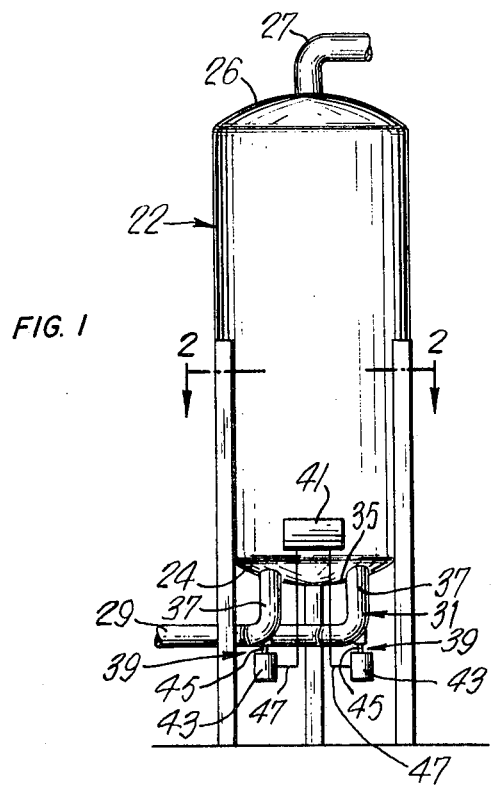
FIG. 1 is a front elevation view showing an upflow treatment tower having improved feeding means at its inlet end.
Figure 2:
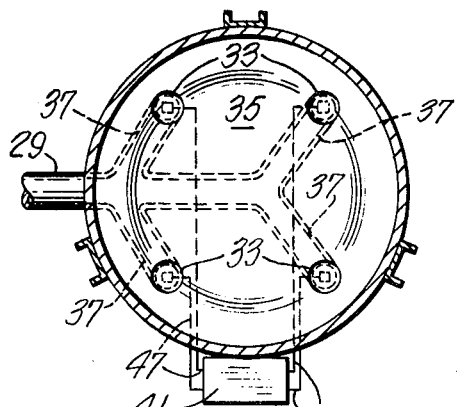
FIG. 2 is a cross-section view of the tower shown in FIG. 1 taken along line 1—1.

FIGS. 1 and 2 illustrate a vertical upflow tower 22 having an inlet end 24 adjacent the bottom of the tower and an outlet end 26 adjacent the top. A single pipe 27 can be provided at the outlet end for continuously directing treated material from the tower. A main feed pipe 29 is located adjacent the inlet end 24 at the base of the tower for feeding material to a feeding unit 31 at the bottom of the tower. The feeding unit 31 includes a plurality of spaced apart openings 33 in the base 35 of the tower. Branch conduits 37 connect the pipe 29 to each opening. Four openings 33 are shown in FIG. 2, but two, three or more than four openings can be provided. Each opening 33 can be closed by a motorized valve means 39, movable between open and closed positions, which controls the flow of material through each opening.

Material to be treated in the tower 21 is continuously supplied under pressure, such as by a pump, to the main inlet pipe 29 and through each branch conduit 37. Control means 41 are connected to each motor 43 operating each valve 45 by lines 47. The control means is programmed to selectively open and close the valves 45 in a timed sequence so as to introduce material into the tower from the feed pipe 29 first through one opening which is opened by its valve while the other openings are substantially closed, and after a predetermined period of time, to close the one opening and open another opening simultaneously so as to change the location in the tower base from which material is introduced into the tower without interrupting the continuous feed of material into the tower or the rate of this feed. The amount of material continuously fed into the tower through whichever one of the openings is open is equal to the amount of material flowing through the inlet feed pipe 29. A continuous flow of material upwardly through the tower is obtained. Each of the openings 33, being spaced from each other throughout the area of the base 35 of the tower provides for the introduction of the material into the tower from different locations for predetermined periods of time thus tending to reduce the tendency of the material to channel as it moves upwardly through the tower.

In treating dense slurries or very viscous material, a positive displacement pump is usually used to feed the material through main feed pipe 29 to the upflow tower. When using a positive displacement pump, the material feed cannot be interrupted; otherwise, failure of the system can occur. Thus, when using a positive displacement pump, the control means 41 is programmed to open and close the valves 45 in such a manner that when one of valves 45 is being moved to an open position to feed material into the tower 22, the preceding open valve is simultaneously being closed. Both the opening valve and closing valve are moved simultaneously, slowly to their final positions to avoid interrupting the flow from the positive displacement pump.

Figure 3:
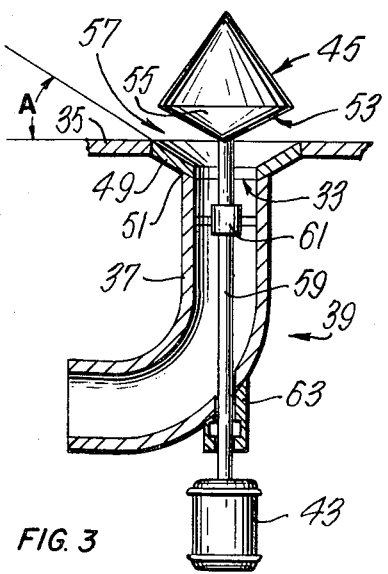
FIG. 3 is a cross-section view illustrating, in detail, a preferred type of valve for use in controlling the feeding of material to the tower shown in FIG. 1.

FIG. 3 illustrates a preferred valve means 39 for opening and closing each of the openings 33. The branch conduit 37 is curved to extend vertically to the base 35 of the tower from its connection with the main feed pipe. An annular, conical segment, plate 49 joins the end 51 of the conduit 37 to the base 35 of the tower. The valve 45 comprises a conical based plug 53 mounted for movement between a closed position, wherein its lower conical surface 55 rests flush against the annular conical plate 49 to close the opening 33, and an open position where it is spaced therefrom forming an annular channel 57 extending at an angle A to the base 35 of the tower. The plug 53 is connected by a stem 59 to motor 43. Operation of the motor 43 by the control means 41 moves the plug between its open and closed positions. The stem can be mounted in a guide means 61 concentrically located within the vertical section of the conduit so as to concentrically locate the plug 53 with respect to the seat of the valve formed by the conical plate 49. The valve stem can pass through the wall of the conduit and a bushing 63 for connection to the motor. The bushing is sealed to prevent the loss of the material from the conduit. The valve means 39, constructed to direct material annularly outwardly through channel 57 toward the sides of the tower, rather than vertically, further reduces the tendency of the material to channel when any one valve is open while the others remain closed. The angle A of the channel 57 can range between 10° and 45°.

The invention is particularly adapted for continuously feeding a slurry of high consistency to a tower, such as, for example, pulp stock, having a consistency ranging between 8% to 20%, and which pulp stock is to be bleached in the tower. By a slurry, it is meant a material comprising a mixture of solids and liquids.

While the feeding unit has been described to have one valve slowly opening while a preceding open valve is slowly closing, the feeding unit can also work satisfactorily, to reduce channeling, by having one valve fully open and the remaining valves slightly open so that the major portion of the material being fed continuously through the tower emerges from one opening only but can leak from the other openings so that positive seating of the valves is not essential. Always, however, although the flow of material into and out of the tower remains continuous, all or the majority of flow into the tower occurs from different locations at different periods of time so as to reduce the tendency of the material to channel as it flows up through the tower.

I claim:

1. A tower for treating material flowing vertically therethrough, said tower having a lower material inlet end and an upper material outlet end, feeding means for feeding material continuously into the tower at the lower material inlet end from a material supply source at a constant rate, said feeding means comprising a supply conduit connected to said material supply source, a plurality of spaced apart material passageways, one end of each passageway connected to the supply conduit, the other end of each passageway opening into the bottom of the tower at a location spaced from the other ends of the passageways, means for supplying material from the supply source through the supply conduit and to the passageways under pressure, a single valve associated with each passageway movable to control the flow of material through each passageway, and control means for moving said valves to substantially open each of said passageways in timed sequence while substantially closing the other passageways to allow material to flow selectively into the bottom of the tower from different locations to minimize channeling while maintaining continuous feed into the tower at a substantially constant rate.

2. A tower as claimed in claim 1, wherein the control means for moving each valve comprises a motor, a timer and actuator mechanism connecting the timer to each of the valve motors for opening and closing the valves in timed sequence.

3. A tower as claimed in claim 1, wherein each passageway is connected to the tower with an annular conical seat and each valve includes a conical surface cooperating with the seat and movable from an opened position spaced from the seat to a closed position abutting the seat.

4. A method of improving the continuous feeding of material into a treatment tower having a bottom inlet end and a top outlet end, with the bottom inlet end having a plurality of spaced-apart passageways connecting a single material supply line to the tower, comprising feeding material through the supply line to all of the passageways under pressure and substantially opening each of said passageways in timed sequence while substantially closing the other passageways in a manner to allow material to flow selectively into the tower from different locations to minimize channeling while maintaining continuous feed into the tower at a constant rate.

* * * * *